United States Patent
Zheng et al.

(10) Patent No.: US 10,282,593 B2
(45) Date of Patent: May 7, 2019

(54) INTELLIGENT SYSTEMS CAPABLE OF AUTOMATIC LOCALIZATION AND METHODS USING THE SAME

(71) Applicant: Huizhou TCL Mobile Communication Co., Ltd, Huizhou, Guangdong (CN)

(72) Inventors: Yu Zheng, Huizhou (CN); Ling Ma, Huizhou (CN)

(73) Assignee: HUIZHOU TCL MOBILE COMMUNICATION CO., LTD, Huizhou, Guangdong Province (CN)

( * ) Notice: Subject to any disclaimer, the term of this patent is extended or adjusted under 35 U.S.C. 154(b) by 0 days.

(21) Appl. No.: 15/313,708

(22) PCT Filed: Apr. 18, 2016

(86) PCT No.: PCT/CN2016/079549
§ 371 (c)(1),
(2) Date: Nov. 23, 2016

(87) PCT Pub. No.: WO2017/028549
PCT Pub. Date: Feb. 23, 2017

(65) Prior Publication Data
US 2017/0177923 A1 Jun. 22, 2017

(30) Foreign Application Priority Data
Aug. 14, 2015 (CN) .......................... 2015 1 0502155

(51) Int. Cl.
*G06K 9/00* (2006.01)
*G06K 9/03* (2006.01)
*G10L 15/22* (2006.01)

(52) U.S. Cl.
CPC ..... *G06K 9/00255* (2013.01); *G06K 9/00288* (2013.01); *G06K 9/00295* (2013.01);
(Continued)

(58) Field of Classification Search
CPC .. G06K 9/00255; G06K 9/03; G06K 9/00295; G06K 9/00664; G10L 15/22; G10L 2015/223; G10L 2015/227
See application file for complete search history.

(56) References Cited

U.S. PATENT DOCUMENTS 7,822,508 B2 * 10/2010 Sugiyama .............. B25J 9/1612
318/568.12
2005/0151842 A1 7/2005 Oohashi
(Continued)

FOREIGN PATENT DOCUMENTS

| CN | 103426214 A | 12/2013 |
|----|-------------|---------|
| CN | 203812304 U | 9/2014 |
| CN | 105069437 A | 11/2015 |

OTHER PUBLICATIONS

International Search Report on corresponding PCT application (PCT/CN2016/079549) from International Searching Authority (CN) dated Jul. 21, 2016.

*Primary Examiner* — Ruiping Li
(74) *Attorney, Agent, or Firm* — Cheng-Ju Chiang (57) ABSTRACT

Intelligent systems capable of automatic localization and methods using the same are disclosed. An intelligent system includes an intelligent robot and a plurality of face recognition devices each in a wireless connection with the intelligent robot. Each face recognition device is disposed at the entrance of a room, and is configured to identify face information of people in the room and transmit the face information to the intelligent robot. The intelligent robot thus updates a database according to the face information and automatically identifies a location of a subject to be served based on the database. Thus, the present disclosure can automatically identify the location of the subject to be served.

15 Claims, 4 Drawing Sheets (52) U.S. Cl.
CPC ..... *G06K 9/00664* (2013.01); *G06K 9/00892* (2013.01); *G06K 9/03* (2013.01); *G10L 15/22* (2013.01); *G10L 2015/223* (2013.01); *G10L 2015/227* (2013.01)

(56) References Cited

U.S. PATENT DOCUMENTS

| | | | | |
|---|---|---|---|---|
| 2007/0233321 | A1* | 10/2007 | Suzuki | G05D 1/0251 700/245 |
| 2013/0035790 | A1* | 2/2013 | Olivier, III | G05D 1/0246 700/246 |

* cited by examiner

INTELLIGENT SYSTEMS CAPABLE OF AUTOMATIC LOCALIZATION AND METHODS USING THE SAME

TECHNICAL FIELD

The present disclosure relates generally to intelligent systems and technologies, and in particular relates to intelligent systems capable of automatic localization and methods using the same.

BACKGROUND

Development and industrialization of domestic robots (i.e., service robots) are the future trends. Domestic robots will gradually spread to millions of households. For example, existing sweeping robots can implement the sweeping function.

However, current domestic service robots are unable to identify the location of a direct or indirect person to be served, which severely affects the user experience.

SUMMARY

Embodiments of the present disclosure provide intelligent systems capable of automatic localization and methods of using the same, which can automatically identify the location of a subject to be served.

There is provided an intelligent system capable of automatic localization, the system comprising an intelligent robot and a plurality of face recognition devices each in a wireless connection with the intelligent robot. Each face recognition device may be disposed at the entrance of a room, and may be configured to identify face information of people inside the room and transmit the face information to the intelligent robot. The intelligent robot may be configured to update a database according to the face information and automatically identify a location of a subject to be served based on the updated database. Specifically, each face recognition device may comprise a first processor, a first memory, a transmitter, and a first bus, where the first processor, transmitter, and first memory are coupled to the first bus, respectively. The first memory may be configured to store a first program, and the first processor may be configured to execute the first program, the first program being configured to:

collect face information of people entering and leaving the corresponding room;

transmit via the transmitter the face information to the intelligent robot;

while the intelligent robot may comprise a second processor, a second memory, a receiver, and a second bus, where the second processor, second memory, and receiver are coupled to the second bus, respectively. The second memory may be configured to store a second program, and the second processor may be configured to execute the second program, the second program being configured to:

receive via the receiver the face information and a voice command;

identify the subject to be served according to the voice command; and update the database according to the face information, and search the database for the location of the subject to be served.

The second program may further be configured to:

determine whether there is a person entering or leaving the corresponding room;

if there is a person coming out of the room, obtain a number of people inside the room and determine whether the number equals zero; and if so determined, generate an error flag in the database;

if the number is not zero or there is a person coming into the room, then search the database for the corresponding face information of the person;

if the face information is found, update the entry and exit information of the person to the database; and if the face information is not found, mark the person as a stranger and update the entry and exit information of the stranger to the database.

The second program may further be configured to:

determine whether the subject to be served is the subject that issues the voice command;

if so determined, read the database for data of the rooms where there are people and analyze a direction of the voice command to identify the location of the subject to be served;

if not so determined, search the database for a match of the subject to be served;

if a match is found, identify the location of the subject to be served; and if a match is not found or identification of the location of the subject to be served fails, ask for the location of the subject to be served.

There is also provided an intelligent system capable of automatic localization, the system comprising an intelligent robot and a plurality of face recognition devices each in a wireless connection with the intelligent robot. Each face recognition device may be disposed at the entrance of a room, and may be configured to identify face information of people inside the room and transmit the face information to the intelligent robot. The intelligent robot may be configured to update a database according to the face information and automatically identify a location of a subject to be served based on the database.

Each face recognition device may comprise a face recognition module and a first communication module coupled to the face recognition module. The face recognition module may be configured to collect face information of people entering and leaving the corresponding room, and transmit the face information to the intelligent robot via the first communication module.

The intelligent robot may comprise a processing module, a voice recognition module, a storage module, and a second communication module, where the voice recognition module, storage module, and second communication module are coupled to the processing module, respectively. The intelligent robot may be configured to establish a wireless connection with the first communication module via the second communication module, and so receive the face information from the first recognition device. The voice recognition module may be configured to receive a voice command and identify the subject to be served according to the voice command. The storage module may be configured to store a database. The processing module may be configured to update the database according to the face information, and search the database for the location of the subject to be served.

The processing module may be configured to:

determine whether there is a person entering or leaving the corresponding room;

if there is a person coming out of the room, obtain a number of people inside the room and determine whether the number equals zero, and if so determined, generate an error flag in the database;

if the number is not zero or there is a person coming into the room, then search the database for the corresponding face information of the person;

if the face information is found, then update the entry and exit information of the person to the database; and if the face information is not found, mark the person as a stranger and update the entry and exit information of the stranger to the database.

The processing module searching the database for the location of the subject to be served may comprise:

determining, by the processing module, whether the subject to be served is the subject that issues the voice command;

if so determined, reading the database for data of the rooms where there are people and analyze a direction of the voice command to identify the location of the subject to be served;

if not so determined, searching the database for a match of the subject to be served;

if a match is successfully found, identifying the location of the subject to be served; and if a match is not found or identification of the location of the subject to be served fails, asking, by the intelligent robot, for the location of the subject to be served.

There is also provided a method of automatically identifying a location of a subject to be served using an intelligent system that comprises an intelligent robot and a plurality of face recognition devices each in a wireless connection with the intelligent robot, where each face recognition device may be disposed at an entrance of a room. The method comprises:

identifying, by each face recognition device, face information of people inside the corresponding room, and transmitting the face information to the intelligent robot;

updating, by the intelligent robot, a database according to the face information, and automatically searching the database for the location of the subject to be served.

Each face recognition device identifying the face information of people inside the corresponding room may comprise:

capturing, by the face recognition device, face information of people entering and leaving the corresponding room.

The method may further comprise identifying the subject to be served according to the voice command.

The intelligent robot updating the database according to the face information may comprise:

determining, by the intelligent robot, whether there is a person entering or leaving the corresponding room;

if there is a person coming out of the room, obtaining a number of people inside the room and determining whether the number equals zero, and if so determined, generating, by the intelligent robot, an error flag in the database;

if the number is not zero or there is a person coming into the room, then searching, by the intelligent robot, the database for the corresponding face information of the person;

if the face information is found, then updating, by the intelligent robot, the entry and exit information of the person to the database; and if the face information is not found, marking, by the intelligent robot, the person as a stranger and updating the entry and exit information of the stranger to the database.

The database automatically searching the database for the location of the subject to be served may comprise:

determining, by the intelligent robot, whether the subject to be served is the subject that issues the voice command;

if so determined, reading, by the intelligent robot, the database for data of the rooms where there are people and analyze a direction of the voice command to identify the location of the subject to be served;

if not so determined, searching, by the intelligent robot, the database for a match of the subject to be served;

if a match is found, identifying, by the intelligent robot, the location of the subject to be served;

if a match is not found or identification of the location of the subject to be served fails, asking, by the intelligent robot, for the location of the subject to be served.

According to the above solutions provided by the present disclosure, the intelligent system comprises an intelligent robot and a plurality of face recognition devices each in a wireless connection with the intelligent robot. Each face recognition device may be disposed at the entrance of a room, and may be configured to identify information of people inside the room and transmit the information to the intelligent robot. As such, the intelligent robot can search for the location of the subject to be served based on the information.

DETAILED DESCRIPTION

Figure 1:
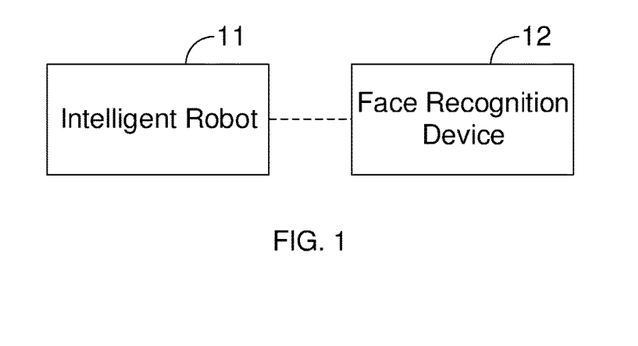
FIG. 1 is a block diagram illustrating an intelligent system according to a first embodiment of the disclosure.

Referring to FIG. 1, a block diagram of an intelligent system according to a first embodiment of the disclosure is depicted. The intelligent system may typically be applied to smart home services, hence a smart home system. The intelligent system 10 may comprise an intelligent robot 11 and a plurality of face recognition devices 12. Each face recognition device 12 may set up a wireless connection with the intelligent robot 11.

Each face recognition device 12 may be installed at the entrance of a room. For example, the face recognition device 12 can be provided at the entrance of a washroom or kitchen. Typically, the plurality of face recognition devices 12 may be disposed at entrances of multiple rooms, respectively.

Each face recognition device 12 may be configured to collect face information of the people entering and leaving the corresponding room, and transmit the face information to the intelligent robot 11. As such, the intelligent robot 11 may update a database according to the face information, so that it can automatically search the database for a location of a subject to be served. The subject to be served means a person the intelligent robot 11 is to provide service to. For example, if the intelligent robot 11 is to serve John Smith, then John Smith is the subject to be served.

According to the present embodiment, each face recognition device 12 may identify the face information of the people within the corresponding room and transmit the face information to the intelligent robot 11, so that the intelligent robot 11 can base on the database to automatically search for the location of the subject to be served.

Figure 2:
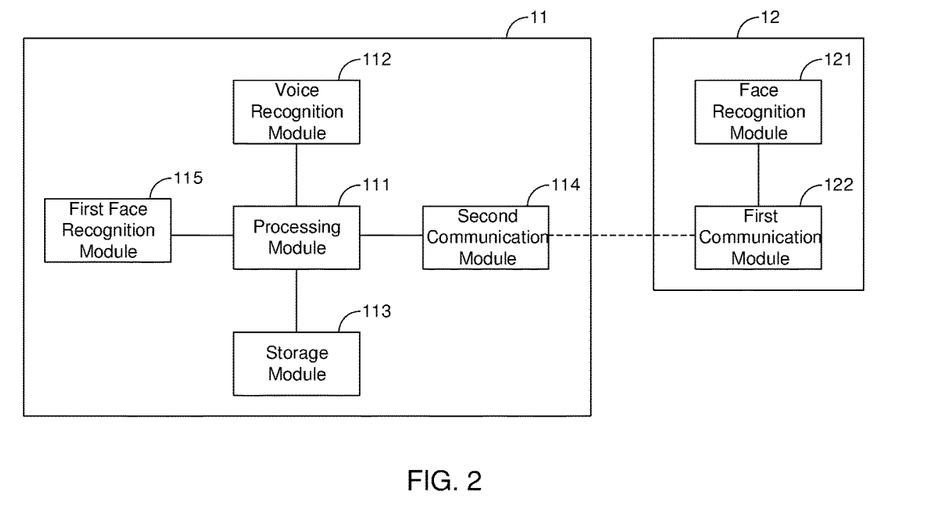
FIG. 2 is a block diagram illustrating an intelligent system according to a second embodiment of the disclosure.

Referring now to FIG. 2, a block diagram of an intelligent system according to a second embodiment of the disclosure is depicted, which is described below based on the intelligent system 10 as illustrated in the first embodiment. In the second embodiment, each face recognition device 12 may comprise a face recognition module 121 and a first communication module 122. The intelligent robot 11 may comprise a processing module 111, a voice recognition module 112, a storage module 113, and a second communication module 114. Typically, the first communication module 122 and the second communication module 114 may be WIFI modules or Bluetooth modules.

The first communication module 122 may be in a connection with the face recognition module 121. The face recognition module 121 may be configured to collect face information of people entering and leaving the corresponding room, and transmit the collected face information to the intelligent robot 11 via the first communication module 122.

Optionally, the face recognition module 121 may further be configured to determine whether there is a person coming out of or into the corresponding room. In particular, if the face recognition module 121 detects there is a person walking from indoors to approach the face recognition device 12, it may determine the person is coming out of the room; if the face recognition module 121 detects there is a person walking from outdoors to near the face recognition device 12, it may determine the person is coming into the room.

The voice recognition module 112, storage module 113, and second communication module 114 are coupled to the processing module 111 respectively. The intelligent robot 11 may build up a wireless connection with the first communication module 122 of each face recognition device 12 through the second communication module 114, and so receive the face information collected by the face recognition device 12. The voice recognition module 112 may be configured to receive a voice command and identify the subject to be served according to the voice command. The storage module 113 may be configured to store a database, and the processing module 111 may be configured to update the database according to the face information and search the database for the location of the subject to be served.

In particular, the processing module 111 may be configured to determine whether there is a person entering or leaving the room. More specifically, the processing module 111 may rely on the detection of the face recognition module 121 to determine whether there is a person coming out of or into the room. If the processing module 111 determines there is a person walking out of the room, it may be configured to obtain a number of people within the room from the database and determine whether the number equals zero.

If the number equals zero, the processing module 111 may be configured to generate an error flag in the database.

If the number is not zero or the processing module 111 determines there is a person coming into the room, then the processing module 111 may be configured to search the database for the face information, i.e., the face information collected by the face recognition device 12.

If the processing module 111 finds the face information in the database, then it may be configured to update the entry and exit information of the person to the database.

Otherwise if the processing module 111 fails to find the face information in the database, then it may be configured to mark the person as a stranger and further update the entry and exit information of the stranger to the database.

The processing module 111 searching the database for the location of the subject to be served may specifically comprise:

determining, by the processing module 111, whether the subject to be served is the subject that issues the voice command;

if so determined, reading, by the processing module 111, the database for data of the rooms where there are people and analyzing a direction of the voice command to identify the location of the subject to be served;

if not so determined, searching, by the processing module 111, the database for a match of the subject to be served;

if a match is found, identifying, by the processing module 111, the location of the subject to be served;

if a match is not found or identification of the location of the subject to be served fails, asking, by the intelligent robot 11, for the location of the subject to be served.

The processing module 111 may be configured to obtain a direction of the voice command using the voice recognition module 112. The voice recognition module 112 may perform voice collection and processing to obtain the direction of the voice command. In particular, the voice recognition module 112 may use a voice collector to capture the audio data of at least four channels in order to locate the direction of the voice command. For instance, the voice collector may consist of four omnidirectional microphones, which are installed around the head of the intelligent robot 11. Each channel may sample 2048 data points at a frequency of 10000 Hz.

Considering that the voice command may reach each microphone at different time instants, the voice command can be located based on time of arrival differences between these microphones. The voice recognition module 112 may be configured to first divide the surrounding space into 8 directions, then determine from which direction the voice command comes based on the time of arrival, and further compute the direction of the voice command based on the time of arrival differences.

Optionally, the intelligent robot 11 may further comprise a first face recognition module 115 which is coupled to the processing module 111 and configured to capture the face information of subjects to be served.

In particular, when it is needed to change or modify the information of the family members in the database, the user may trigger the information collection function embedded in the intelligent robot 11, by which the intelligent robot 11 may use the first face recognition module 115 to capture information of a first face, and the processing module 111 may compare the first face information with the face information already stored in the database for a match.

If a match is successfully found, the user may then enter the unique identification information corresponding to the first face information, such as a name. The processing module 111 may store the first face information and the unique identification information in the database.

If a match is not found, the intelligent robot 11 may prompt the user whether to modify the people information.

If the user chooses so, the processing module 111 may accordingly modify the database;

If the user desires no modification, then the process will be ended.

Typically, the database may contain names of subjects to be served, together with the corresponding face information, voice information, and current location information.

Figure 3:
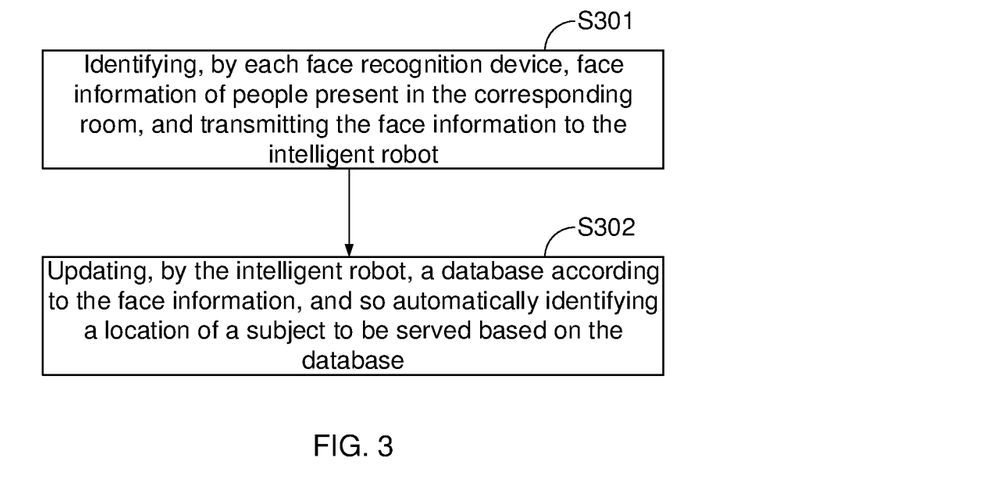
FIG. 3 is a flowchart illustrating a method of automatically identifying a location of a subject to be served using the intelligent system according to the first embodiment of the disclosure.

Referring now to FIG. 3, a flowchart of a method of automatically identifying a location of a subject to be served using the intelligent system according to the first embodiment of the disclosure is depicted. The method as performed by the intelligent system 10 illustrated in the first embodiment may comprise the following blocks.

In S301, each face recognition device 12 may be configured to identify face information of people present in the corresponding room, and transmit the detected face information to the intelligent robot 11.

In S302, the intelligent robot 11 may be configured to update the database according to the face information, so that it may further automatically identify the location of the subject to be served based on the database.

In particular, in S301 each face recognition device 12 may be installed at the entrance of a room. For example, the face recognition device 12 can be provided at the entrance of a washroom or kitchen. Typically, a plurality of face recognition devices 12 may be disposed at entrances of multiple rooms, respectively.

Each face recognition device 12 may be configured to collect face information of the people entering and leaving the corresponding room, and transmit the face information to the intelligent robot 11.

Accordingly, in S302, the intelligent robot 11 may be configured to recognize the subject to be served according to the voice command, and update the database according to the face information, so that it can automatically identify the location of the subject to be served based on the database. The subject to be served refers to a person the intelligent robot 11 is to provide service to. For example, if the intelligent robot 11 is to serve Joe Smith, then Joe Smith would be the subject to be served.

Figure 4:
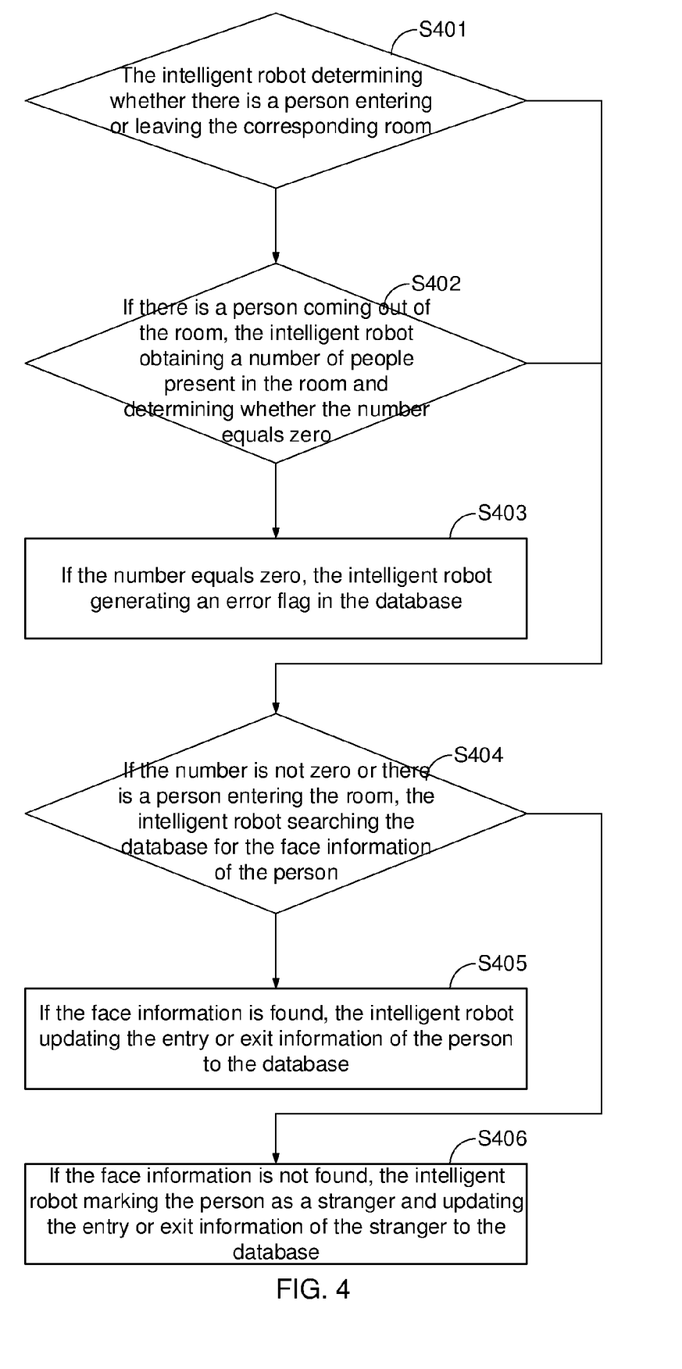
FIG. 4 illustrates the process by which the intelligent robot updates the database according to the face information as illustrated in FIG. 3.
Figure 5:
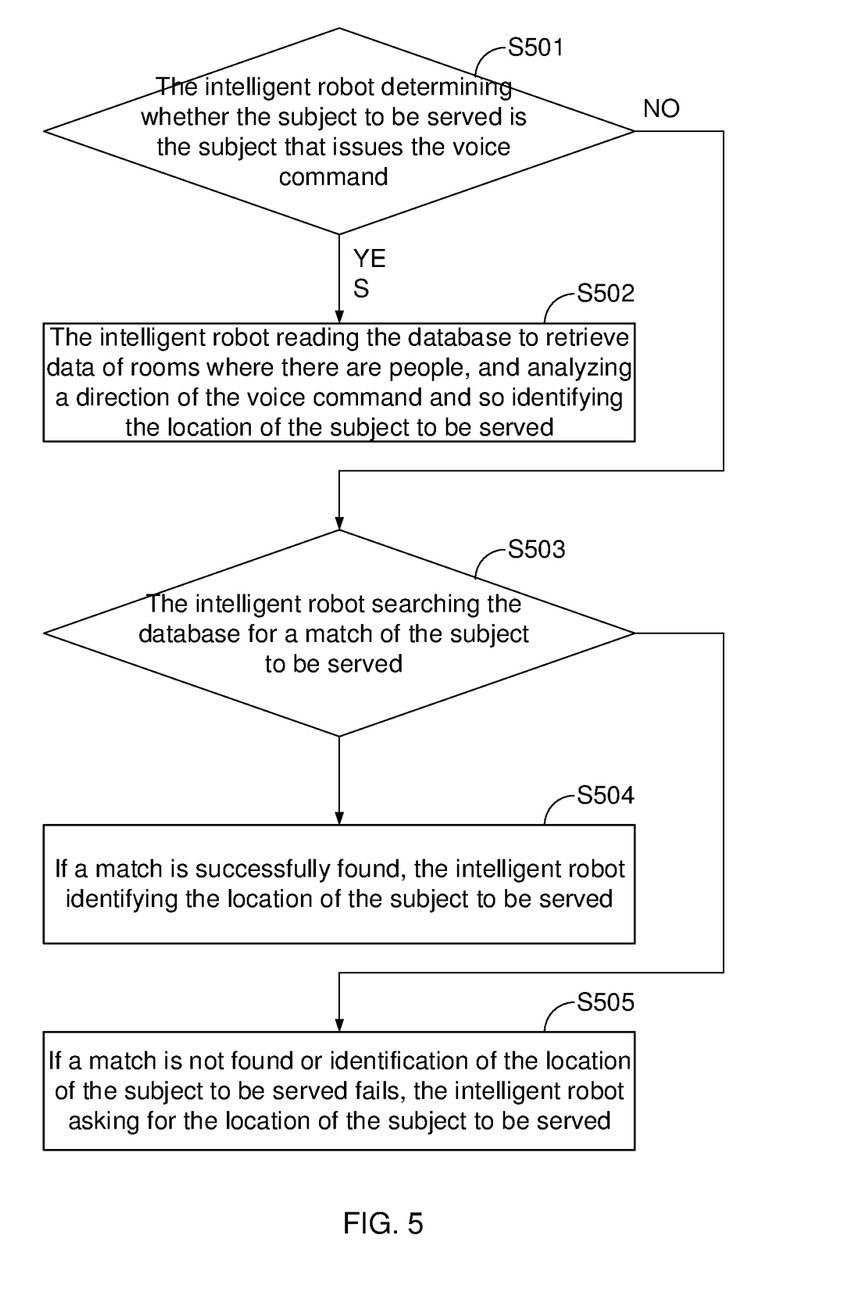
FIG. 5 illustrates the process by which the intelligent robot automatically identifies the location of the subject to be served based on the database as illustrated in FIG. 3.

Referring now to FIGS. 4 and 5, a flowchart of a method of automatically identifying a location of a subject to be served using the intelligent system according to the second embodiment of the disclosure is depicted. Below the method is described based the intelligent system according to the second embodiment. FIG. 4 illustrates the process by which the intelligent robot 11 updates the database according to the face information, where the process may specifically comprise the following blocks.

In S401, the intelligent robot 11 may determine whether there is a person entering or leaving the corresponding room.

Particularly, the intelligent robot 11 may use the face recognition device 12 to determine whether there is a person coming out of or into the room.

In S402, if there is a person coming out of the room, the intelligent robot 11 may obtain a number of people inside the room and determine whether the number equals zero.

In S403, if the number equals zero, the intelligent robot 11 may generate an error flag in the database correspondingly.

In S404, if the number is not zero or there is a person coming into the room, then the intelligent robot 11 may search the database for the corresponding face information.

That is, the intelligent robot 11 may search the database for the face information captured by the face recognition device 12.

In S405, if the face information is found, then the intelligent robot 11 may update the entry and exit information of the person to the database.

In particular, if the intelligent robot 11 finds in the database the face information captured by the face recognition device 12, it may update the entry and exit information of this person to the database.

In S406, if the face information is not found, the intelligent robot 11 may mark the person as a stranger and update the entry and exit information of the stranger to the database.

In this case, the intelligent robot 11 cannot find the face information captured by the face recognition device 12 in the database.

FIG. 5 illustrates the process by which the intelligent robot 11 automatically identifies the location of the subject to be served, the process specifically comprising the following blocks.

In S501, the intelligent robot 11 may determine whether the subject to be served is the subject that issues the voice command.

In S502, if so determined, the intelligent robot 11 may read the database for data of the rooms where there are people and analyze a direction of the voice command to identify the location of the subject to be served.

In S503, if not so determined, the intelligent robot 11 may search the database for a match of the subject to be served;

In S504, if a match is found, the intelligent robot 11 may directly identify the location of the subject to be served.

In S505, if a match is not found or identification of the location of the subject to be served fails, the intelligent robot 11 may ask for the location of the subject to be served.

The present disclosure also provides an intelligent system capable of automatic localization, the system comprising an intelligent robot and a plurality of face recognition devices each in a wireless connection with the intelligent robot. Each face recognition device may be disposed at the entrance of a room, and may be configured to identify face information of people inside the room and transmit the face information to the intelligent robot. The intelligent robot may be configured to update a database according to the face information and automatically search for a location of a subject to be served based on the database.

Each face recognition device may comprise a first processor, a first memory, a transmitter, and a first bus, where the first processor, transmitter, and first memory are coupled to the first bus, respectively. The first memory may be configured to store a first program, and the first processor may be configured to execute the first program, the first program being configured to:

collect face information of people entering and leaving the corresponding room;

transmit via the transmitter the face information to the intelligent robot.

The intelligent robot may comprise a second processor, a second memory, a receiver, and a second bus, where the second processor, second memory, and receiver are coupled to the second bus, respectively. The second memory may be configured to store a second program, and the second processor may be configured to execute the second program, the second program being configured to:

receive via the receiver the face information and a voice command;

identify the subject to be served according to the voice command; and update the database according to the face information, and searching the database for the location of the subject to be served.

The second program may be further configured to:

determine whether there is a person entering or leaving the corresponding room;

if there is a person coming out from the room, obtain a number of people within the room and determine whether the number equals zero; and if so determined, generate an error flag in the database accordingly;

if the number is not zero or there is a person coming into the room, then search the database for the corresponding face information of the person;

if the face information is found, then update the entry and exit information of the person to the database;

if the face information is not found, mark the person as a stranger and update the entry and exit information of the stranger in the database.

The second program may be further configured to:

determine whether the subject to be served is the subject that issues the voice command;

if so determined, read the database for data of the rooms where there are people and analyze a direction of the voice command to identify the location of the subject to be served;

if not so determined, search the database for a match of the subject to be served;

if a match is found, identify the location of the subject to be served;

if a match is not found or identification of the location of the subject to be served fails, ask for the location of the subject to be served.

The memory may comprise a USB flash disk, mobile hard drive, Read-only Memory (ROM), Random Access Memory (RAM), magnetic disk, optical disk, or any other medium that is able to store program codes. The processor may execute all or part of the methods illustrated in various embodiments of the disclosure.

According to the above description of the disclosure, the intelligent system comprises an intelligent robot and a plurality of face recognition devices each in a wireless connection with the intelligent robot. Each face recognition device may be disposed at the entrance of a room, and may be configured to identify information of people in the room and transmit the information to the intelligent robot, so that the intelligent robot can search for the location of the subject to be served based on the information.

The above description depicts merely some exemplary embodiments of the disclosure, but is not intended to limit the scope of the disclosure. Any equivalent structures or flow transformations made to the disclosure or any direct or indirect applications of the disclosure on other related fields shall all be covered within the protection of the disclosure.

What is claimed is:

1. An intelligent system capable of automatic localization, comprising an intelligent robot and a plurality of face recognition devices each in a wireless connection with the intelligent robot, wherein each face recognition device is installed at an entrance of a corresponding room, and is configured to identify face information of people present in the corresponding room and transmit the face information to the intelligent robot, and the intelligent robot is configured to update a database according to the face information and automatically identify a location of a subject to be served based on the database; the database contains names of subjects to be served, and corresponding face information, voice information, and current location information;

each face recognition device comprises a first processor, a first memory, a transmitter, and a first bus, where the first processor, the transmitter, and the first memory are coupled to the first bus, respectively, wherein the first memory is configured to store a first program, and the first processor is configured to execute the first program, the first program being configured to:

collect face information of people entering and leaving the corresponding room;

transmit via the transmitter the face information to the intelligent robot; and the intelligent robot comprises a second processor, a second memory, a receiver, and a second bus, where the second processor, the second memory, and the receiver are coupled to the second bus, respectively, wherein the second memory is configured to store a second program, and the second processor is configured to execute the second program, the second program being configured to:

receive via the receiver the face information and a voice command;

identify the subject to be served according to the voice command, obtain a name of the subject to be served; and update the database according to the face information, and search the database for the location of the subject to be served, determine the location of the subject to be served according to the corresponding current location information of the name of the subject to be served;

wherein, the second program is further configured to:

determine whether there is a person entering or leaving the corresponding room;

if there is a person coming out of the corresponding room, obtain a number of people in the corresponding room from the database and determine whether the number equals zero;

if the number equals zero, generate an error flag in the database; and if the number is not zero or there is a person coming into the corresponding room, search the database for the corresponding face information of the person;

if the face information is found in the database, update the entry and exit information of the person to the database; and if the face information is not found, mark the person as a stranger and update the entry and exit information of the stranger to the database.

2. The intelligent system according to claim 1, wherein the second program is further configured to:

determine whether the subject to be served is the subject that issues the voice command;

if the subject to be served is the subject that issues the voice command, read the database for data of the rooms where there are people; analyze a direction of the voice command; and identify the room where there are people in the direction of the voice command as the location of the subject to be served; and if the subject to be served is not the subject that issues the voice command, search the database for a match of the subject to be served;

if the match of the subject to be served is found in the database, identify the location of the subject to be served; and if the match of the subject to be served is not found or identification of the location of the subject to be served fails, ask for the location of the subject to be served.

3. An intelligent system capable of automatic localization, comprising an intelligent robot and a plurality of face recognition devices each in a wireless connection with the intelligent robot, wherein:

each face recognition device is installed at an entrance of a corresponding room, and is configured to identify face information of people in the corresponding room and transmit the face information to the intelligent robot, and the intelligent robot is configured to update a database according to the face information, the database contains names of subjects to be served, and corresponding face information, voice information, and current location information; receive a voice command, identify a subject to be served according to the voice command; and automatically identify a location of the subject to be served based on the database;

wherein, each face recognition device comprises a face recognition module and a first communication module coupled to the face recognition module, the face recognition module being configured to collect face information of people entering and leaving the corresponding room and transmit the face information to the intelligent robot via the first communication module;

the intelligent robot comprises a processing module, a voice recognition module, a storage module, and a second communication module, where the voice recognition module, storage module, and second communication module are coupled to the processing module, respectively, wherein the intelligent robot is configured to establish a wireless connection with the first communication module via the second communication module and so receive the face information from the face recognition device, the voice recognition module is configured to receive a voice command and identify the subject to be served according to the voice command, the storage module is configured to store a database, and the processing module is configured to update the database according to the face information, and search the database for the location of the subject to be served;

wherein, the processing module is further configured to:

determine whether there is a person entering or leaving the corresponding room;

if there is a person coming out of the corresponding room, obtain a number of people in the corresponding room from the database and determine whether the number equals zero;

if the number equals zero, generate an error flag in the database; and if the number is not zero or there is a person coming into the corresponding room, search the database for the corresponding face information of the person;

if the face information is found in the database, update the entry and exit information of the person to the database; and if the face information is not found, mark the person as a stranger and update the entry and exit information of the stranger to the database.

4. The intelligent system according to claim 3, wherein the processing module searching the database for the location of the subject to be served comprises:

determining, by the processing module, whether the subject to be served is the subject that issues the voice command;

if the subject to be served is the subject that issues the voice command, reading, by the processing module, the database for data of rooms where there are people and analyzing a direction of the voice command to identify the location of the subject to be served; and if the subject to be served is not the subject that issues the voice command, searching, by the processing module, the database for a match of the subject to be served;

if the match of the subject to be served is found in the database, identifying, by the processing module, the location of the subject to be served; and if the match of the subject to be served is not found or identification of the location of the subject to be served fails, asking, by the intelligent robot, for the location of the subject to be served.

5. A method of automatically identifying a location of a subject to be served using an intelligent system that comprises an intelligent robot and a plurality of face recognition devices each in a wireless connection with the intelligent robot, wherein each face recognition device is installed at an entrance of a corresponding room, the method comprising:

identifying, by each face recognition device, face information of people present in the corresponding room and transmitting the face information to the intelligent robot; and updating, by the intelligent robot, a database according to the face information, wherein the database contains names of subjects to be served, and corresponding face information, voice information, and current location information;

receiving, by the intelligent robot, a voice command, and identifying the subject to be served according to the voice command; and automatically searching the database for the location of the subject to be served;

wherein, identifying the face information of the people present in the corresponding room comprises:

collecting, by each face recognition device, face information of people entering and leaving the corresponding room;

wherein, the intelligent robot updating the database according to the face information comprises:

determining, by the intelligent robot, whether there is a person entering or leaving the corresponding room;

if there is a person coming out from the corresponding room, obtaining a number of people in the corresponding room from the database and determining whether the number equals zero;

if the number equals zero, generating, by the intelligent robot, an error flag in the database; and if the number is not zero or there is a person coming into the corresponding room, searching, by the intelligent robot, the database for the corresponding face information of the person;

if the face information is found in the database, updating, by the intelligent robot, the entry and exit information of the person to the database; and if the face information is not found, marking, by the intelligent robot, the person as a stranger and updating the entry and exit information of the stranger to the database.

6. The method according to claim 5, wherein automatically searching the database for the location of the subject to be served comprises:

determining, by the intelligent robot, whether the subject to be served is the subject that issues the voice command;

if the subject to be served is the subject that issues the voice command, reading, by the intelligent robot, the database for data of rooms where there are people and analyzing a direction of the voice command to identify the location of the subject to be served; and if the subject to be served is not the subject that issues the voice command, searching, by the intelligent robot, the database for a match of the subject to be served;

if the match of the subject to be served is found in the database, identifying, by the intelligent robot, the location of the subject to be served; and if the match of the subject to be served is not found or identification of the location of the subject to be served fails, asking, by the intelligent robot, for the location of the subject to be served.

7. The intelligent system according to claim 1, wherein the intelligent robot further comprises an image capture device, and the first processor is further configured to:
capture via the image capture device the face information of subjects to be served;
the first processor is specifically configured to:
capture, via the image capture device, information of a first face of a subject;
compare the first face information with the face information already stored in the database for a match;
if a match is found so that a user enters unique identification information corresponding to the first face information, store the first face information and the unique identification information in the database; and
if a match is not found, prompt the user whether to add the first face information;
if the user chooses yes, add the first face information together with the corresponding unique identification information the user enters to the database; and
if the user chooses no, end the process.

8. The intelligent system according to claim 3, wherein the intelligent robot further comprises a first face recognition module coupled to the processing module configured to capture the face information of subjects to be served;
the first face recognition module is specifically configured to capture information of a first face of a subject, and the processing module is configured to:
compare the first face information with the face information already stored in the database for a match;
if a match found so that a user enters unique identification information corresponding to the first face information, store the first face information and the unique identification information in the database; and
if a match is not found, prompt the user whether to add the first face information to the database;
if the user chooses yes, add the first face information together with the corresponding unique identification information the user enters to the database; and
otherwise if the user chooses no, end the process.

9. The method according to claim 5, further comprising:
capturing, by the intelligent robot, a first face information of a subject;
comparing, by the intelligent robot, the first face information of the subject with the face information already stored in the database for a match;
if the first face information of the subject matches the face information already stored in the database, entering, by a user, unique identification information corresponding to the first face information of the subject, and storing, by the intelligent robot, the first face information of the subject and the unique identification information in the database;
if the first face information of the subject does not match the face information already stored in the database, prompting, by the intelligent robot, the user whether to add the first face information;
if the user chooses to add the first face information of the subject, adding, by the intelligent robot, the first face information of the subject together with the corresponding unique identification information the user enters to the database; and
if the user chooses not to add the first face information of the subject, ending the process.

10. The intelligent system according to claim 1, wherein the second program is configured to update a face information in the database to the face information from the face recognition device; and update a corresponding current location information of the face information in the database to the corresponding room where the people are present in.

11. The intelligent system according to claim 4, wherein the voice recognition module comprises a voice collector consisting of four omnidirectional microphones;
the analyzing the direction of the voice command comprises:
dividing a surrounding space of the intelligent robot into eight directions;
determining from which direction the voice command comes based on a time arriving to the microphones.

12. The method according to claim 5, wherein the updating, by the intelligent robot, the database according to the face information comprises:
updating the face information in the database to the face information from the face recognition device;
updating a corresponding current location information of the face information in the database to the corresponding room where the people are present in.

13. The method according to claim 5, wherein the identifying the subject to be served according to the voice command comprises:
obtaining a name of the subject to be served;
the searching the database for the location of the subject to be served comprises:
determining the location of the subject to be served according to the corresponding current location information of the name of the subject to be served.

14. The method according to claim 6, wherein the analyzing the direction of the voice command to identify the location of the subject to be served comprises:
analyzing a direction of the voice command;
determining a room in the direction of the voice command based on the data of the rooms where there are people;
identifying the room in the direction as the location of the subject to be served.

15. The method according to claim 6, wherein the intelligent robot comprises a voice collector consisting of four omnidirectional microphones for receiving a voice command;
the analyzing the direction of the voice command comprising:
dividing a surrounding space of the intelligent robot into eight directions;
determining from which direction the voice command comes based on a time arriving to the microphones.

* * * * *